US009656527B2

United States Patent
Morishige

(10) Patent No.: US 9,656,527 B2
(45) Date of Patent: May 23, 2017

(54) SUSPENSION MEMBER LOWER ARM BRACKET STRUCTURE

(71) Applicant: TOYOTA JIDOSHA KABUSHIKI KAISHA, Toyota-shi, Aichi-ken (JP)

(72) Inventor: Yuji Morishige, Nissin-shi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/242,927

(22) Filed: Aug. 22, 2016

(65) Prior Publication Data

US 2017/0087948 A1 Mar. 30, 2017

(30) Foreign Application Priority Data

Sep. 29, 2015 (JP) ................................ 2015-192284

(51) Int. Cl.
*B60G 7/00* (2006.01)

(52) U.S. Cl.
CPC ........ *B60G 7/001* (2013.01); *B60G 2206/122* (2013.01)

(58) Field of Classification Search
CPC ........................ B60G 7/001; B60G 2206/122
See application file for complete search history.

(56) References Cited

U.S. PATENT DOCUMENTS

| 6,508,482 B2* | 1/2003 | Pierce | B60G 7/001 280/124.116 |
| 7,726,673 B2* | 6/2010 | Saieg | B60G 7/001 280/124.116 |
| 8,141,904 B2* | 3/2012 | Akaki | B62D 21/02 180/312 |
| 8,523,208 B2* | 9/2013 | Rezania | B60G 3/145 267/257 |
| 8,967,646 B2* | 3/2015 | Schwarz | B60G 7/001 280/124.116 |
| 9,333,826 B1* | 5/2016 | Saieg | B60G 9/003 |
| 2002/0140220 A1* | 10/2002 | Tatsumi | B60G 3/20 280/781 |
| 2006/0278463 A1* | 12/2006 | Anzai | B62D 21/11 180/312 |
| 2013/0127146 A1* | 5/2013 | Ohno | B60K 15/063 280/781 |

FOREIGN PATENT DOCUMENTS

JP 2014-144658 A 8/2014

* cited by examiner

*Primary Examiner* — Darlene P Condra
(74) *Attorney, Agent, or Firm* — Oliff PLC

(57) ABSTRACT

A lower arm bracket is provided. A portion of the lower arm bracket is an upper panel that includes a first surface wall, a second surface wall, a third surface wall, a first coupling surface wall connecting the first surface wall and the second surface wall together, and a first vertical wall extending toward the vehicle lower side from a position including an end portion in the length direction of the first coupling surface wall. A portion of the lower arm bracket is configured by a lower panel that includes a fourth surface wall, a fifth surface wall, a sixth surface wall, a third coupling surface wall connecting the fourth surface wall and the fifth surface wall together, and a second vertical wall extending toward the vehicle upper side from a position including an end portion in the length direction of the third coupling surface wall.

2 Claims, 9 Drawing Sheets

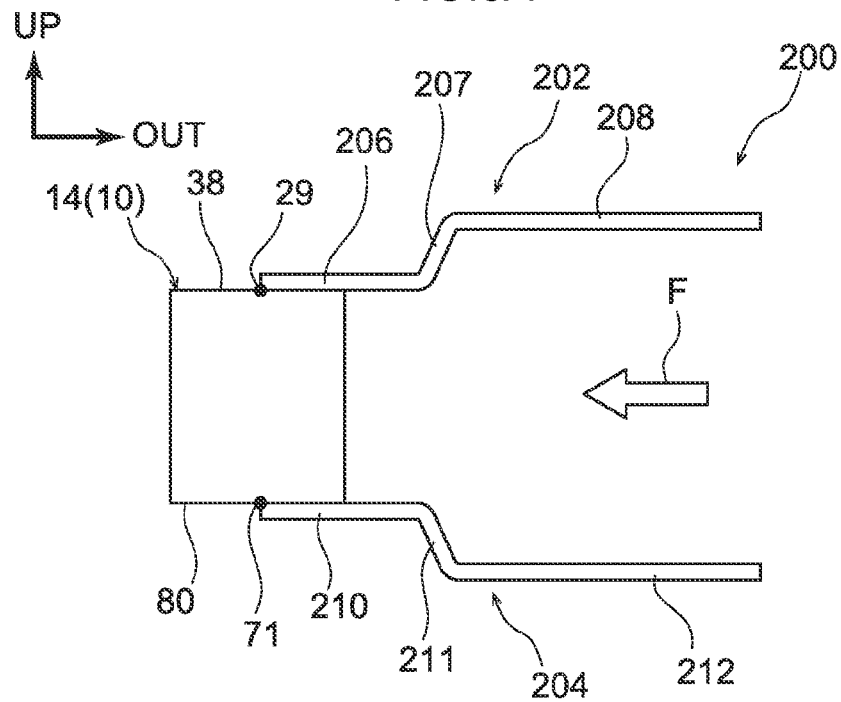
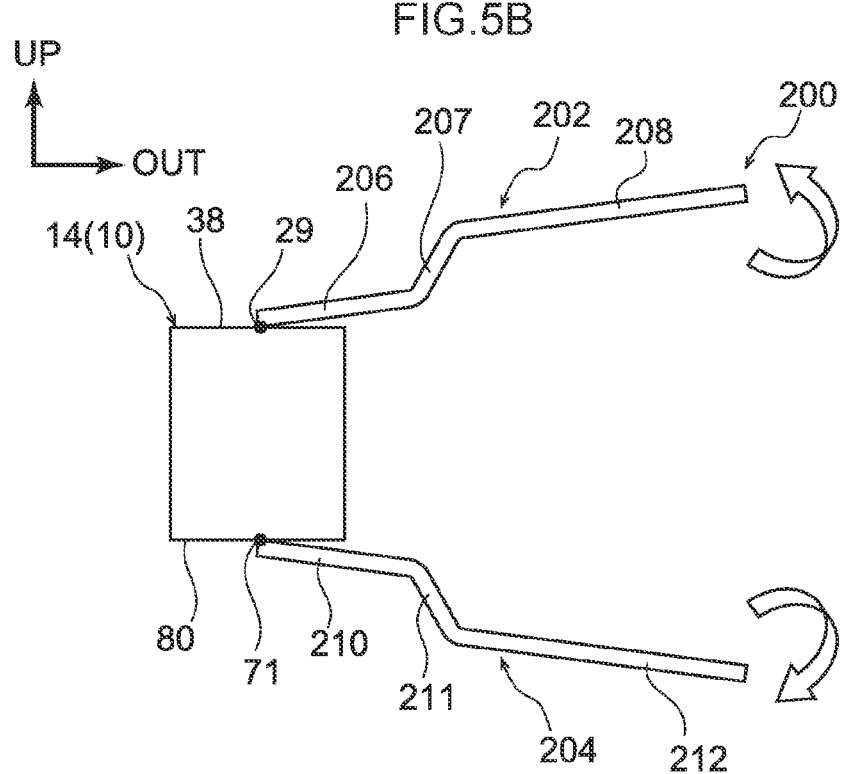

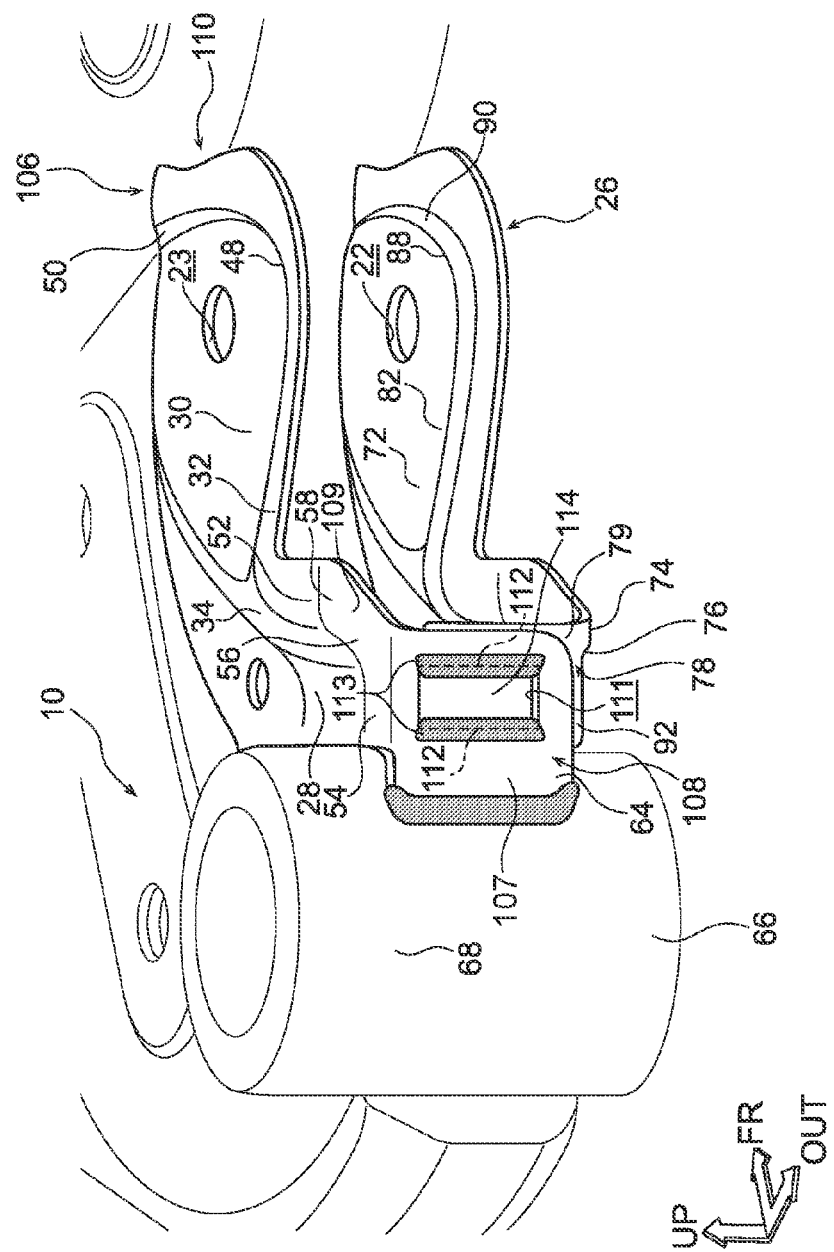

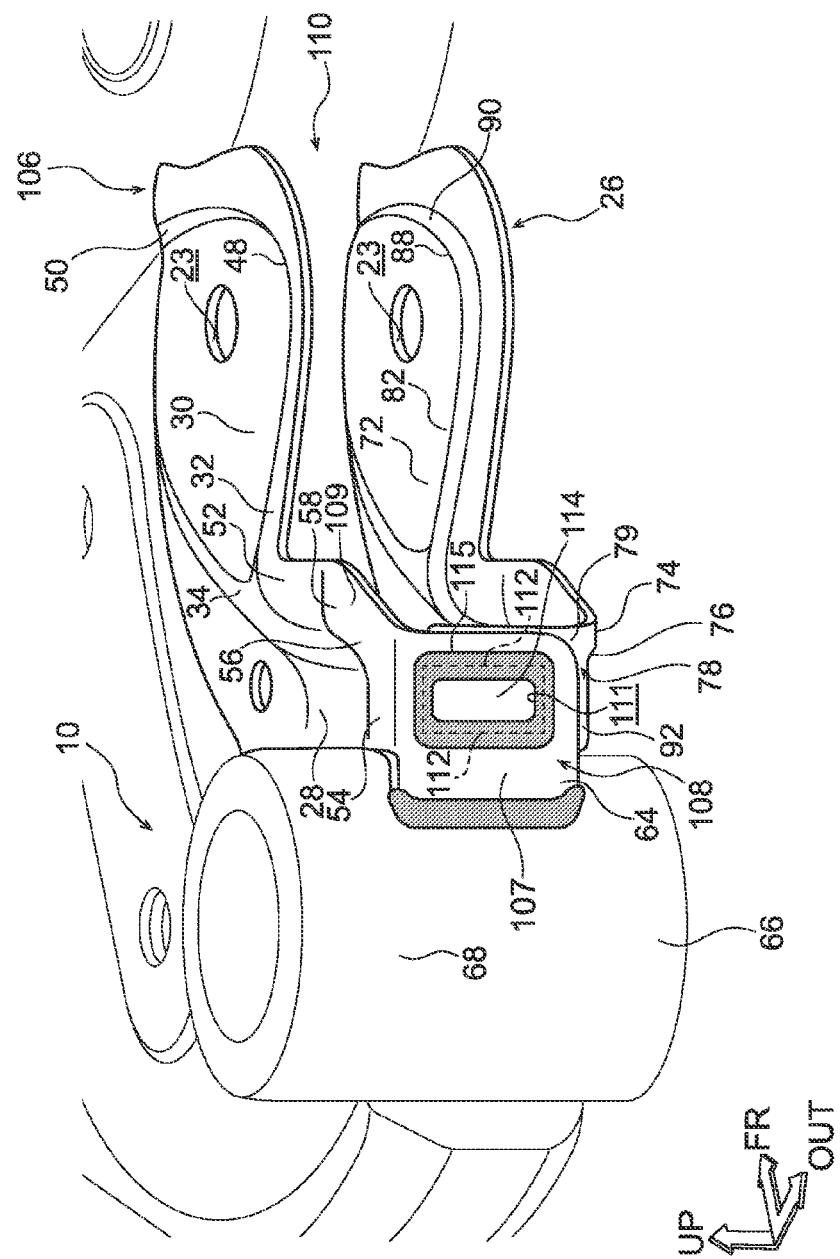

SUSPENSION MEMBER LOWER ARM BRACKET STRUCTURE

CROSS-REFERENCE TO RELATED APPLICATION

This application claims priority under 35 USC 119 from Japanese Patent Application No. 2015-192284 filed on Sep. 29, 2015, the disclosure of which is incorporated by reference herein.

BACKGROUND

Technical Field

The present disclosure relates to a suspension member lower arm bracket structure.

Related Art

Japanese Patent Application Laid-Open (JP-A) No. 2014-144658 describes a vehicle front section structure. More specifically, a lower arm that configures a portion of a suspension, and a suspension member that supports the lower arm are provided. A front side attachment portion of the lower arm is rotatably attached to a rod shaped front side arm attachment portion attached to an upper face of the suspension member, with the axial direction of the front side attachment portion of the lower arm in the vehicle front-rear direction. Moreover, a rear side attachment portion of the lower arm is rotatably attached through a bushing to a lower arm bracket attached to an outside wall of the suspension member, with the axial direction of the rear side attachment portion of the lower arm in the vehicle vertical direction. The lower arm is thereby attached so as to be displaceable with respect to the suspension member.

The lower arm bracket rotatably supporting the rear side attachment portion of the lower arm is generally configured with a bushing clamped between an upper panel and a lower panel. However, if load from the lower arm is input to the lower arm bracket toward the vehicle rear side, there is a possibility that the upper panel and lower panel of the lower arm bracket will deform in directions separating from each other in the vehicle vertical direction, and a possibility that each will deform so as to bend. In order to prevent such deformations, although it would be conceivable to add other members in addition to the upper panel and the lower panel to increase the strength of the lower arm bracket, in such cases the weight would increase due to the number of components increasing. There is therefore room for further improvement with respect to increasing the strength of the lower arm bracket while suppressing an increase in the number of components.

SUMMARY

The present disclosure obtains a suspension member lower arm bracket structure capable of increasing the strength of the lower arm bracket, while suppressing an increase in the number of components.

A first aspect of the present disclosure is a suspension member lower arm bracket structure including (1) a suspension member provided at a vehicle lower side of a side member of a vehicle and supported by the side member, (2) a lower arm bracket provided at a vehicle width direction outer side of the suspension member, (3) an upper panel that configures an upper portion of the lower arm bracket, and that is disposed at a position corresponding to an upper side face of the suspension member, (4) a lower panel that configures a lower portion of the lower arm bracket, and that is disposed separated from the upper panel in a vehicle vertical direction at a position corresponding to a lower side face of the suspension member, and (5) a bushing that is disposed between the upper panel and the lower panel such that an axial direction of the bushing is in the vehicle vertical direction, wherein (A) the upper panel has (i) a first surface wall that has a plate thickness direction in the vehicle vertical direction, and that includes an upper joint joined to the upper side face of the suspension member, (ii) a second surface wall that is connected to the first surface wall through a first coupling surface wall, that is disposed offset from the first surface wall toward the vehicle upper side, and that includes a bushing upper end abutting portion that abuts an end portion at the vehicle upper side of the bushing, (iii) a third surface wall that is connected to the second surface wall through a second coupling surface wall, that is disposed offset from the second surface wall toward the vehicle upper side, and that is formed along an end portion at the vehicle width direction outer side of the second surface wall, and (iv) a first vertical wall that is connected to the first surface wall, the first coupling surface wall, and at least one end portion, in a circumferential direction of the bushing, of the second coupling surface wall and the third surface wall, and that extends toward the vehicle vertical direction lower side, and (B) the lower panel has (v) a fourth surface wall that has a plate thickness direction in the vehicle vertical direction, and that includes a lower joint joined to the lower side face of the suspension member, (vi) a fifth surface wall that is connected to the fourth surface wall through a third coupling surface wall, that is disposed offset from the fourth surface wall toward the vehicle lower side, and that includes a bushing lower end abutting portion that abuts an end portion at the vehicle lower side of the bushing, (vii) a sixth surface wall that is connected to the fifth surface wall through the fourth coupling surface wall, that is disposed offset from the fifth surface wall toward the vehicle lower side, and that is formed along an end portion at the vehicle width direction outer side of the fifth surface wall, and (viii) a second vertical wall that is connected to the fourth surface wall, the third coupling surface wall, and at least one end portion, in the circumferential direction of the bushing of, the fourth coupling surface wall and the sixth surface wall, and that extends toward the vehicle vertical direction upper side, and wherein (C) the first vertical wall and the second vertical wall are overlapped with each other as viewed along plate thickness directions thereof and joined together by a vertical wall joint.

According to the first aspect, the lower arm bracket is provided at a vehicle width direction outside of the suspension member. The lower arm bracket is configured including the upper panel and the lower panel. The upper panel is joined to the upper side face of the suspension member by the first surface wall, including the upper joint, and the end portion at the vehicle upper side of the bushing abuts the bushing upper end abutting portion of the second surface wall. Moreover, the third surface wall is formed at the end portion at the vehicle width direction outside of the second surface wall. The third surface wall is disposed offset from the second surface wall toward the vehicle upper side, and is connected to the second surface wall through the second coupling surface wall. Namely, the second coupling surface wall is formed substantially along a vehicle vertical direction so as to couple together the second surface wall and the third surface wall, disposed offset toward the vehicle upper side thereof. Accordingly, the bending rigidity of the second surface wall is increased by the second coupling surface wall and the third surface wall. Moreover, the first vertical wall is connected to the first surface wall, the first coupling surface wall provided between the first surface wall and the second surface wall, and at least one end portion, in a circumferential direction of the bushing, of, the second coupling surface wall and the third surface wall, and extends toward the vehicle vertical direction lower side. The bending rigidity of the first coupling surface wall and the surrounding regions thereof, where stress is liable to concentrate, is thereby increased. Accordingly, after load from the bushing is input to the upper panel, although load is transmitted to the second surface wall joined to the bushing, load can be transmitted to the suspension member through the first surface wall without deforming the second surface wall, the first coupling surface wall, or the surrounding portions thereof due to the bending rigidity of the second surface wall, the first coupling surface wall, and the surrounding portions being increased.

The lower panel is joined to the lower side face of the suspension member by fourth surface wall, including the lower joint, and the end portion at the vehicle lower side of the bushing abuts the bushing lower end abutting portion of the fifth surface wall. Moreover, the sixth surface wall is formed at the end portion at the vehicle width direction outside of the fifth surface wall. The sixth surface wall is disposed offset from the fifth surface wall toward the vehicle lower side, and is connected to the fifth surface wall through the fourth coupling surface wall. Namely, the fourth coupling surface wall is formed substantially along a vehicle vertical direction so as to connect together the fifth surface wall and the sixth surface wall, disposed offset toward the vehicle lower side thereof. The bending rigidity of the fifth surface wall is thereby increased by the fourth coupling surface wall and the sixth surface wall. Moreover, the second vertical wall is connected to the fourth surface wall, the third coupling surface wall provided between the fourth surface wall and the fifth surface wall, and at least one end portion, in the circumferential direction of the bushing, of the fourth coupling surface wall and the sixth surface wall, and extends toward the vehicle vertical direction upper side. The bending rigidity of the third coupling surface wall and the surrounding regions thereof, where stress is liable to concentrate, is thereby increased. Accordingly, after load from the bushing is input to the lower panel, although load is transmitted to the fifth surface wall joined to the bushing, the load can be transmitted to the suspension member through the fourth surface wall without deforming the fifth surface wall, the third coupling surface wall, or the surrounding portions thereof, due to the bending rigidity of the fifth surface wall, the third coupling surface wall, and the surrounding portions thereof being increased. Moreover, the first vertical wall and the second vertical wall are overlapped with each other as viewed along the plate thickness directions thereof and joined together by the vertical wall joint, increasing the bending rigidity of the first vertical wall and the second vertical wall. Accordingly, the bending rigidities of the first coupling surface wall of the upper panel and the third coupling surface wall of the lower panel are further increased. This enables the bending rigidity of the upper panel and the lower panel to be further increased. This enables the bending rigidity to thereby be increased, without the addition of separate components in addition to the upper panel and the lower panel.

A second aspect of the present disclosure is the suspension member lower arm bracket structure of the first aspect, wherein a through-hole is formed in one out of the first vertical wall or the second vertical wall so as to penetrate through in the plate thickness direction thereof, and the vertical wall joint is formed in a ring shape around an inner periphery of the through-hole.

According to the second aspect, the vertical wall joint is formed in a ring shape around the inner periphery of the through-hole. Namely, configuration is made in which the join region is made larger, and an end portion in the length direction the vertical wall joint is not provided due to the vertical wall joint being continuous. Although stress is generally liable to concentrate at length direction end portions of vertical wall joints, in the configuration of the present disclosure there are no locations provided where stress is liable to concentrate, thereby enabling a joined state to be maintained. Accordingly, the join strength between the first vertical wall and the second vertical wall can be further increased.

The suspension member lower arm bracket structure according to the first aspect above enables the strength of the lower arm bracket to be increased, while suppressing an increase in the number of components.

The suspension member lower arm bracket structure according to the second aspect above enables the strength of the lower arm bracket to be further increased, while suppressing an increase in the number of components.

BRIEF DESCRIPTION OF THE DRAWINGS

Exemplary embodiments of the present disclosure will be described in detail based on the following figures, wherein:

FIG. 5A is a schematic cross-section illustrating a state in which a suspension member lower arm bracket structure according to a comparative example is sectioned along a vehicle vertical direction;

FIG. 5B is a schematic cross-section of FIG. 5A, illustrating in a deformed state caused by input of load;

FIG. 6 is perspective view illustrating a suspension member lower arm bracket structure according to a second exemplary embodiment;

FIG. 7 is a perspective view illustrating a modified example of the suspension member lower arm bracket structure of FIG. 6;

DETAILED DESCRIPTION

First Exemplary Embodiment

Figure 1:
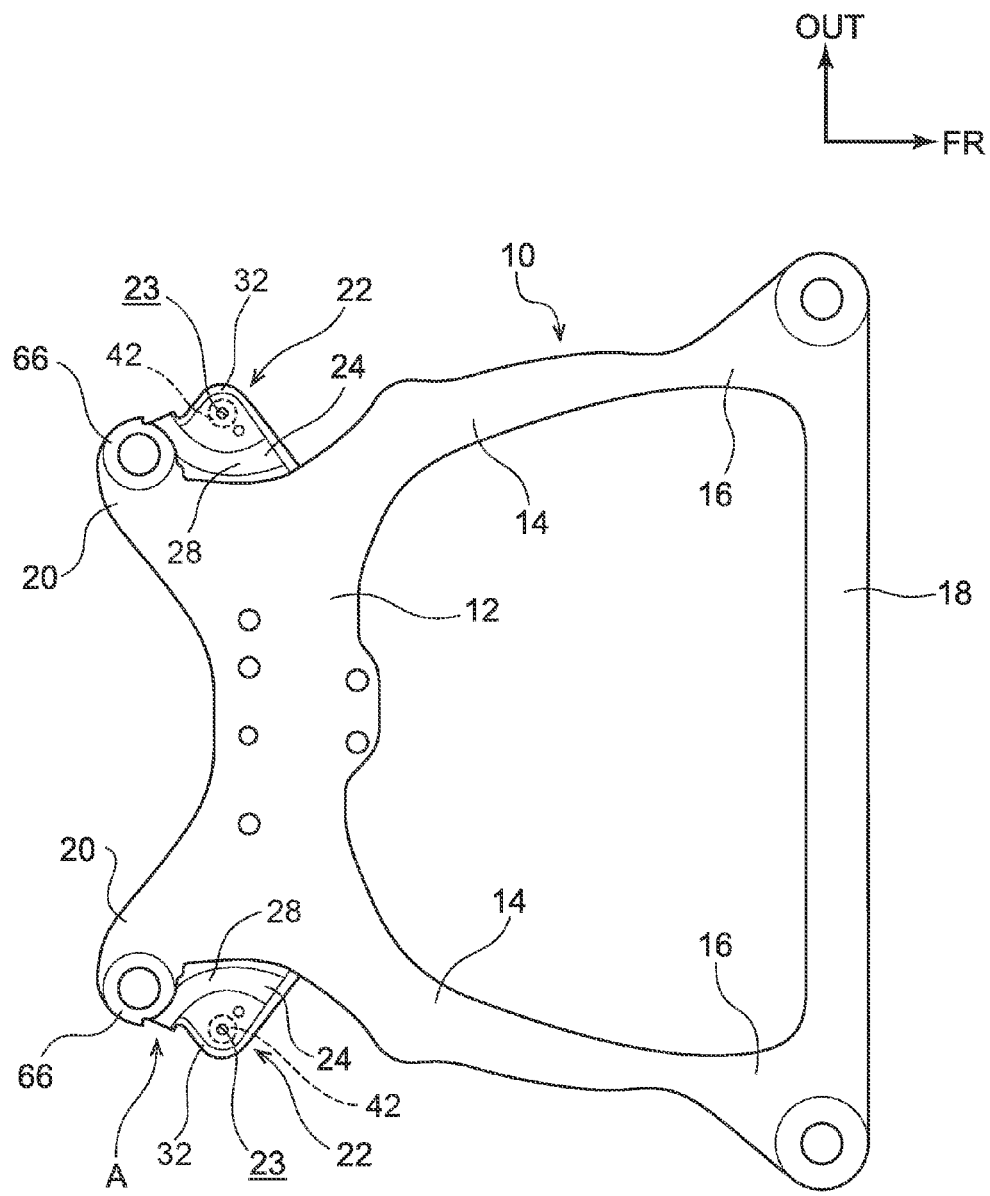
FIG. 1 is a plan view illustrating a suspension member including suspension member lower arm bracket structures according to a first exemplary embodiment.

Explanation follows regarding an exemplary embodiment of a suspension member lower arm bracket structure according to the present disclosure, with reference to FIGS. 1 to 4. In the drawings, the arrow FR indicates a vehicle front-rear direction front side, the arrow OUT indicates a vehicle width direction outside, and the arrow UP indicates a vehicle vertical direction upper side.

As illustrated in FIG. 1, a suspension member 10, to which a suspension arm, a steering gear box (neither of which are illustrated in the drawings), and the like are attached, is provided to a front section of the vehicle. The suspension member 10 is disposed in an engine room at a vehicle lower side of a pair of left and right side members (omitted from illustration) that are disposed separated from each other in a vehicle width direction and that extend in the vehicle front-rear direction. The suspension member 10 is supported by the side members.

The suspension member 10 is formed substantially frame shaped in vehicle plan view. More specifically, the suspension member 10 includes a main body 12 extending in the vehicle width direction at a rear side of a vehicle, a pair of left and right arms 14 respectively extending in the vehicle front-rear direction from both vehicle width direction end portions of the main body 12, and a front cross member 18 that extends in the vehicle width direction and couples respective leading end portions 16 at the vehicle front side of the left and right arms 14 together in the vehicle width direction. In the present exemplary embodiment, as an example, the suspension member 10 is configured from steel. However, there is no limitation thereto, and the suspension member 10 may be configured by another metal such as an aluminum alloy.

The right side arm 14 and the left side arm 14 are formed symmetrical to each other in the vehicle width direction. A vehicle rear end portion 20 of the arm 14 of the respective arms 14 is fastened to the vehicle body through a fastener or the like, not illustrated in the drawings.

Lower arm brackets 22 are joined to the right side arm 14 and left side arm 14 at the vehicle width direction outside of positions corresponding to the main body 12. Since the lower arm brackets 22 are essentially configured with left-right symmetry to each other, explanation is given for the lower arm bracket 22 at the right side, and explanation of the lower arm bracket 22 at the left side is omitted.

Figure 3:
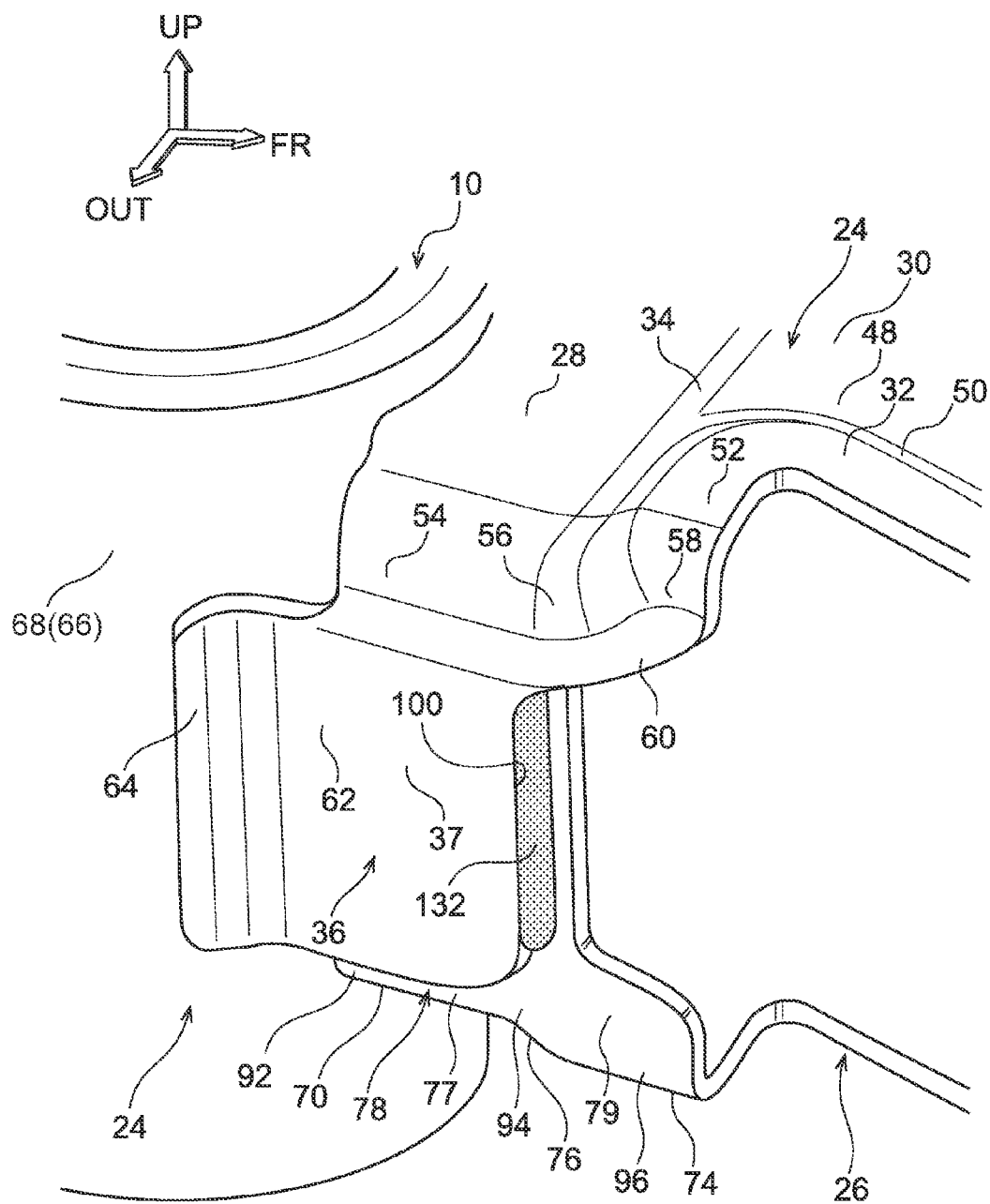
FIG. 3 is a perspective view illustrating relevant portions of a suspension member lower arm bracket structure according to the first exemplary embodiment.
Figure 4:
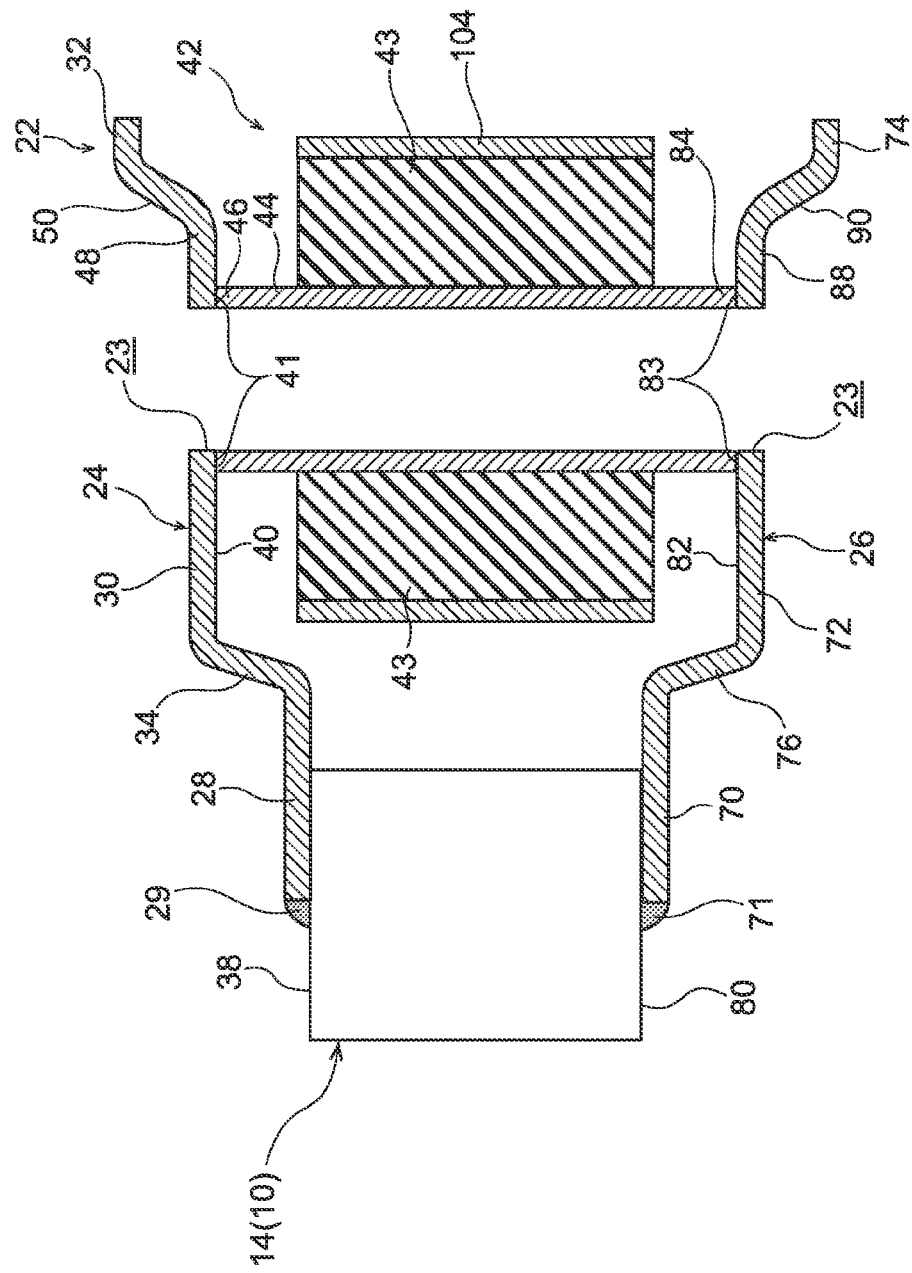
FIG. 4 is a schematic cross-section illustrating a state in which a suspension member lower arm bracket structure according to the first exemplary embodiment sectioned along a vehicle vertical direction.

As illustrated in FIG. 4, the lower arm bracket 22 is configured including an upper panel 24 and a lower panel 26. The upper panel 24 is formed substantially triangular shaped in vehicle plan view (see FIG. 1), and includes a first surface wall 28, a second surface wall 30, a third surface wall 32, a first coupling surface wall 34, a second coupling surface wall 50, and a first vertical wall 36 (see FIG. 3).

The first surface wall 28 is disposed at the vehicle width direction inside of the upper panel 24 with its plate thickness direction in the vehicle vertical direction. The first surface wall 28 is joined to an upper side face 38 of the arm 14 by a welded upper joint 29. Moreover, the first surface wall 28 extends such that its length direction is in the circumferential direction of a bushing 42, described later, in vehicle plan view (see FIG. 1).

The second surface wall 30 is formed further to the vehicle width direction outside than the first surface wall 28. The second surface wall 30 is disposed offset from the first surface wall 28 toward the vehicle upper side. Moreover, a vehicle lower side face 40 of the second surface wall 30 includes a bushing upper end abutting portion 41 that abuts an upper end portion 46 of a bushing inner tube 44 as an end portion at the vehicle upper side of the bushing 42, described later. The second surface wall 30 is connected to the first surface wall 28 through the first coupling surface wall 34, which extends substantially along a vehicle vertical direction as viewed in a cross-section sectioned along the vehicle vertical direction (see FIGS. 2 and 4).

Figure 2:
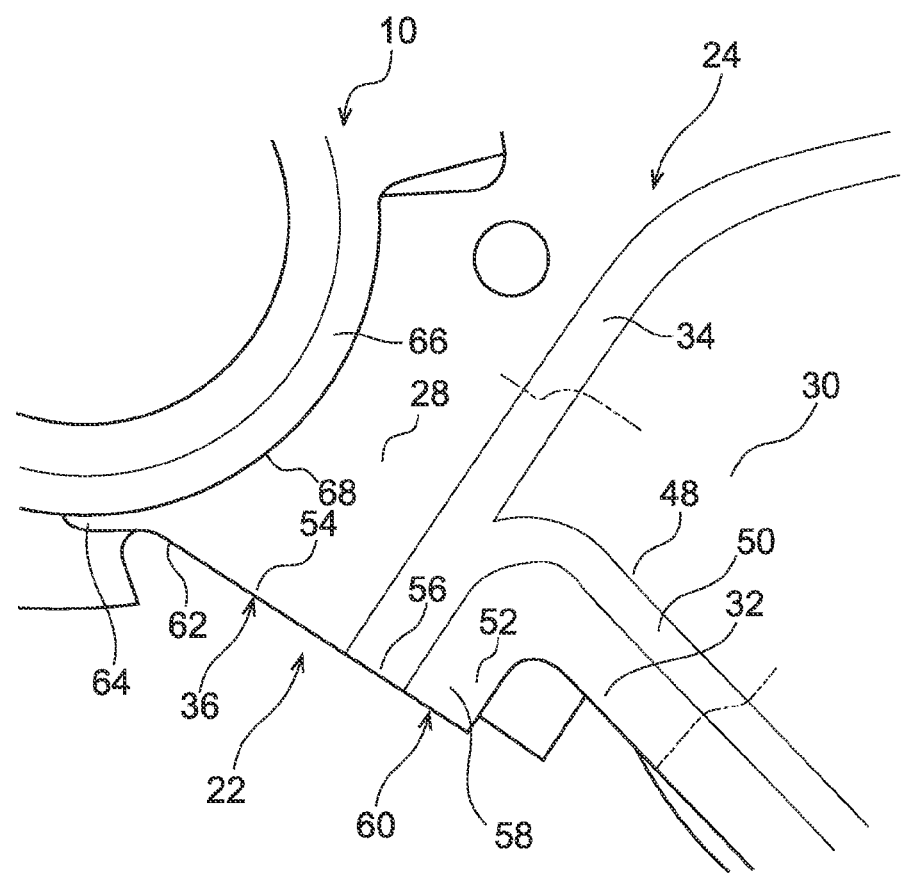
FIG. 2 is an enlarged plan view illustrating the portion A of FIG. 1.

The third surface wall 32 is formed along an end portion 48 at the vehicle width direction outside of the second surface wall 30. The third surface wall 32 is disposed offset from the second surface wall 30 toward the vehicle upper side. The third surface wall 32 is connected to the second surface wall 30 through the second coupling surface wall 50, which extends along substantially a vehicle vertical direction as viewed in a cross-section sectioned along the vehicle vertical direction (see FIGS. 2 and 4). The second coupling surface wall 50 is formed substantially along a vehicle vertical direction, and, more specifically, the second coupling surface wall 50 is inclined so as to approach the vehicle upper side on progression toward the vehicle width direction outside. The third surface wall 32 and the second coupling surface wall 50 extend such that their length directions are in the circumferential direction of the bushing 42, described later, in vehicle plan view (see FIG. 1 and FIG. 2). As illustrated in FIG. 3, an end portion 52 at the vehicle rear side of the third surface wall 32 bends substantially toward the vehicle width direction outside so as to form a substantially L-shape in vehicle plan view.

The first coupling surface wall 34 extends such that its length direction is in the circumferential direction of the bushing 42, described later, in vehicle plan view (see FIG. 1 and FIG. 2). The first vertical wall 36 is connected to an end portion 56 in the length direction of the first coupling surface wall 34, namely, in one direction along the circumferential direction of the bushing 42, described later. The first vertical wall 36 extends from the end portion 56 toward the vehicle vertical direction lower side, and is configured by a vertical wall main body 37 and a front side extension 60. The vertical wall main body 37 extends toward the vehicle vertical direction lower side from an end portion 54 at the vehicle width direction outside of the first surface wall 28, namely, in a direction along the circumferential direction of the bushing 42, and is formed substantially rectangular shaped in vehicle side view. The front side extension 60 is provided contiguously to the vertical wall main body 37, spanning from the end portion 56 in the length direction of the first coupling surface wall 34 (a direction along the circumferential direction of the bushing 42) to an end portion 58 at the vehicle width direction outside of the third surface wall 32 (a direction along the circumferential direction of the bushing 42).

A rear side extension 64 is formed at a rear end portion 62 of the first vertical wall 36. The rear side extension 64 abuts a side wall 68 of a boss 66 formed at the suspension member 10, and a portion of the rear side extension 64 curves along the side wall 68 and is welded thereto so as to be joined to the side wall 68 (see FIG. 6).

The upper panel 24 and the lower panel 26 are formed with plane symmetry to each other, centered about a horizontal plane. Namely, the lower panel 26 is formed substantially triangular shaped in vehicle plan view. Moreover, as illustrated in FIG. 4, the lower panel 26 includes a fourth surface wall 70, a fifth surface wall 72, a sixth surface wall 74, a third coupling surface wall 76, a fourth coupling surface wall 90, and a second vertical wall 78 (see FIG. 3). Note that the center of plane symmetry between the upper panel 24 and the lower panel 26 is not limited to a horizontal plane, and may be somewhat inclined.

The fourth surface wall 70 is disposed at the vehicle width direction inside of the lower panel 26 with its plate thickness direction in the vehicle vertical direction. The fourth surface wall 70 is joined to a lower side face 80 of the arm 14 by a welded lower joint 71. The fourth surface wall 70 extends such that its length direction is in the circumferential direction of the bushing 42, described later, in vehicle plan view (omitted from illustration). Namely, the fourth surface wall 70 and the first surface wall 28 of the upper panel 24 have plane symmetry to each other centered about a horizontal plane.

The fifth surface wall 72 is formed further toward the vehicle width direction outside than the fourth surface wall 70. The fifth surface wall 72 is disposed offset from the fourth surface wall 70 toward the vehicle lower side. Moreover, a vehicle upper side face 82 of the fifth surface wall 72 includes a bushing lower end abutting portion 83 that abuts a lower end portion 84 of the bushing inner tube 44, serving as an end portion at the vehicle lower side of the bushing 42, described later. The fifth surface wall 72 is connected to the fourth surface wall 70 through the third coupling surface wall 76. The third coupling surface wall 76 is formed substantially along a vehicle vertical direction, and, more specifically, the third coupling surface wall 76 is inclined so as to approach the vehicle lower side on progression toward the vehicle width direction outside. Namely, the fifth surface wall 72 and the second surface wall 30 of the upper panel 24 have plane symmetry to each other centered about a horizontal plane.

The sixth surface wall 74 is formed along an end portion 88 at the vehicle width direction outside of the fifth surface wall 72. The sixth surface wall 74 is disposed offset from the fifth surface wall 72 toward the vehicle lower side. The sixth surface wall 74 is formed contiguously to the fifth surface wall 72 through the fourth coupling surface wall 90, which is inclined so as to approach the vehicle lower side on progression toward the vehicle width direction outside. The sixth surface wall 74 and the fourth coupling surface wall 90 extend such that their length directions are in the circumferential direction of the bushing 42, described later, in vehicle plan view, and an end portion at the vehicle rear side of the sixth surface wall 74 bends substantially toward the vehicle width direction outside so as to form a substantially L-shape in vehicle plan view (none of which are illustrated in the drawings). Namely, the sixth surface wall 74 and the third surface wall 32 of the upper panel 24 have plane symmetry to each other centered about a horizontal plane.

As illustrated in FIG. 3, similarly to the first coupling surface wall 34, the third coupling surface wall 76 extends such that its length direction is in the circumferential direction of the bushing 42, described later, in vehicle plan view. The second vertical wall 78 is connected to an end portion 94 in the length direction of the third coupling surface wall 76, namely, one direction along the circumferential direction of the bushing 42, described later. The second vertical wall 78 extends from the end portion 94 toward the vehicle vertical direction upper side, and is configured by a vertical wall main body 77 and a front side extension 79. The vertical wall main body 77 extends toward the vehicle vertical direction upper side from an end portion 92 at the vehicle width direction outside of the fourth surface wall 70, namely, in a direction along the circumferential direction of the bushing 42, and is formed substantially rectangular shaped in vehicle side view. The front side extension 79 is provided contiguously to the vertical wall main body 77, spanning from an end portion 94 in the length direction of the third coupling surface wall 76 (a direction along the circumferential direction of the bushing 42) to an end portion 96 at the vehicle width direction outside of the sixth surface wall 74 (a direction along the circumferential direction of the bushing 42).

The second vertical wall 78 is disposed so as to overlap with the first vertical wall 36 at substantially the vehicle width direction inside thereof. The first vertical wall 36 and the second vertical wall 78 are joined by a vertical wall joint 132 provided along a front end portion 100 of the first vertical wall 36. The vertical wall joint 132 is formed by welding along the front end portion 100.

As illustrated in FIG. 4, the bushing 42 is provided between the upper panel 24 and the lower panel 26. A vehicle vertical direction dimension of the bushing 42 is set larger than a vehicle vertical direction dimension of the arm 14 of the suspension member 10, and the bushing 42 is configured including a rubber bushing 43, a bushing outer tube 104, and the bushing inner tube 44. The rubber bushing 43 is configured by an elastic material such as rubber, and is formed circular tube-shaped with its axial direction in the vehicle vertical direction.

The bushing outer tube 104 and the bushing inner tube 44 are, as an example, configured from metal, and are formed circular tube-shaped with their axial directions in the vehicle vertical direction. A vehicle vertical direction dimension of the bushing inner tube 44 is set larger than the vehicle vertical direction dimension of the bushing outer tube 104 and the vehicle vertical direction dimension of the rubber bushing 43. A diameter dimension of the bushing outer tube 104 is set larger than a diameter dimension of the bushing inner tube 44, and the rubber bushing 43 is press fitted inside the bushing outer tube 104. Moreover, the bushing inner tube 44 is inserted inside the rubber bushing 43. In a state in which the bushing 42 is press fitted into an end portion of the lower arm, not illustrated in the drawings, the bushing 42 is attached to the lower arm bracket 22 by a fastener, not illustrated in the drawings, that has been inserted into a joining hole 23 of the lower arm bracket 22 and inside the bushing inner tube 44.

Operation of the First Exemplary Embodiment

Next, explanation follows regarding operation of the present exemplary embodiment. Operation of the present exemplary embodiment is explained with reference to a comparative example illustrated in FIGS. 5A and 5B. Note that similar configuration parts to those of the present exemplary embodiment are allocated the same reference numerals, and explanation thereof is omitted.

As illustrated in FIG. 5A, a lower arm bracket 200 is provided to an arm 14 of a suspension member 10. The lower arm bracket 200 is configured by an upper panel 202 and a lower panel 204, and configuration is such that a bushing that has been press fitted into a rear end portion of a lower arm (neither of which is illustrated in the drawings) is gripped between the upper panel 202 and the lower panel 204. A vehicle vertical direction dimension of the bushing is set larger than a vehicle vertical direction dimension of the arm 14 of the suspension member 10. Accordingly, a location of the upper panel 202 that abuts an end portion at the vehicle upper side of the bushing is disposed further to the vehicle upper side than a position where the upper panel 202 is joined to the arm 14. Moreover, a location of the lower panel 204 that abuts an end portion at the vehicle lower side of the bushing is disposed further to the vehicle lower side than a position where the lower panel 204 is joined to the arm 14. Namely, the upper panel 202 and the lower panel 204 cannot be integrally formed at each other by drawing or the like since the respective abutting locations to the bushing of the upper panel 202 and the lower panel 204 need to be disposed offset from the respective positions where the arms 14 are joined. Thus, the lower arm bracket 200 is configured by the separate components of the upper panel 202 and the lower panel 204.

In the suspension member 10, the upper panel 202 is configured by a first surface wall 206 that is joined to the upper side face 38 of the arm 14, and by a second surface wall 208 that is disposed offset from the first surface wall 206 toward the vehicle upper side and connected to the first surface wall 206 through a first coupling surface wall 207. The lower panel 204 is configured by a fourth surface wall 210 that is joined to the lower side face 80 of the arm 14, and by a fifth surface wall 212 that is disposed offset from the fourth surface wall 210 toward the vehicle lower side and connected to the fourth surface wall 210 through a second coupling surface wall 211.

As illustrated in FIG. 5B, if load from the bushing is input to the lower arm bracket 200 toward the arm 14 side (the arrow F in FIG. 5A), due to the bushing, not illustrated in the drawings, moving toward the vehicle width direction inside, there is a possibility that the non-illustrated bushing will contact with the first coupling surface wall 207 and the second coupling surface wall 211, and that the upper panel 202 will be pushed upward toward the vehicle upper side and the lower panel 204 will be pushed downward toward the vehicle lower side. Namely, there is a possibility that the upper panel 202 and the lower panel 204 will deform in directions separating from each other in the vehicle vertical direction. Moreover, since stress concentrates at the first coupling surface wall 207 and the second coupling surface wall 211, there is a possibility that the upper panel 202 and the lower panel 204 will deform by bending about the first coupling surface wall 207 and the second coupling surface wall 211. In order to prevent such deformations, although adding other members in addition to the upper panel 202 and the lower panel 204 so as to increase the strength of the lower arm bracket 200 would conceivably suppress such deformations, weight would increase in such cases due to the increase in the number of components. There is therefore room for further improvement with respect to increasing the strength of the lower arm bracket while suppressing an increase in the number of components.

In contrast thereto, in the present exemplary embodiment, as illustrated in FIG. 1, the lower arm brackets 22 are provided at the vehicle width direction outside of the suspension member 10. The lower arm brackets 22 are each configured including the upper panel 24 and the lower panel 26. The upper panel 24 is joined to the upper side face 38 of the suspension member 10 by the first surface wall 28, including the upper joint 29, and the upper end portion 46 of the bushing 42 abuts the bushing upper end abutting portion 41 of the second surface wall 30. Moreover, the third surface wall 32 is formed at the end portion 48 at the vehicle width direction outside of the second surface wall 30. The third surface wall 32 is disposed offset from the second surface wall 30 toward the vehicle upper side, and is connected to the second surface wall 30 through the second coupling surface wall 50. Namely, the second coupling surface wall 50 is formed substantially along a vehicle vertical direction in order to couple together the second surface wall 30 and the third surface wall 32 disposed offset toward the vehicle upper side thereof. Accordingly, the bending rigidity of the second surface wall 30 is increased by the second coupling surface wall 50 and the third surface wall 32. Moreover, the first vertical wall 36 extending toward the vehicle vertical direction lower side is connected to the first surface wall 28, the first coupling surface wall 34 provided between the first surface wall 28 and the second surface wall 30, and at least one end portion 56, in a circumferential direction of the bushing 42, of the second coupling surface wall 50 and the third surface wall 32. This thereby increases the bending rigidity of the first coupling surface wall 34, and surrounding portions thereof, where stress is liable to concentrate. Accordingly, after load from the bushing 42 is input to the upper panel 24, although the load is transmitted to the second surface wall 30 joined to the bushing 42, load can be transmitted to the suspension member 10 through the first surface wall 28 without deforming the second surface wall 30, the first coupling surface wall 34, and the surrounding portions thereof due to the bending rigidity of the second surface wall 30, the first coupling surface wall 34, and the surrounding portions thereof being increased.

The lower panel 26 is joined to the lower side face 80 of the suspension member 10 by the fourth surface wall 70, including the lower joint 71, and the lower end portion 84 of the bushing 42 abuts the bushing lower end abutting portion 83 of the fifth surface wall 72. Moreover, the sixth surface wall 74 is formed at the end portion 88 at the vehicle width direction outside of the fifth surface wall 72. The sixth surface wall 74 is disposed offset from the fifth surface wall 72 toward the vehicle lower side, and is connected to the fifth surface wall 72 through the fourth coupling surface wall 90. Namely, the fourth coupling surface wall 90 is formed substantially along a vehicle vertical direction in order to couple together the fifth surface wall 72 and the sixth surface wall 74 disposed offset toward the vehicle lower side thereof. Accordingly, the bending rigidity of the fifth surface wall 72 is increased by the fourth coupling surface wall 90 and the sixth surface wall 74. Moreover, the second vertical wall 78 extending toward the vehicle vertical direction upper side is connected to the fourth surface wall 70, the third coupling surface wall 76 provided between the fourth surface wall 70 and the fifth surface wall 72, and at least one end portion 94, in one direction along the circumferential direction of the bushing 42, of the fourth coupling surface wall 90 and the sixth surface wall 74. This thereby increases bending rigidity of the third coupling surface wall 76, and surrounding portions thereof, where stress is liable to concentrate. Accordingly, when load from the bushing 42 is input to the lower panel 26, although the load is transmitted to the fifth surface wall 72 joined to the bushing 42, load can be transmitted to the suspension member 10 through the fourth surface wall 70 without the fifth surface wall 72, the third coupling surface wall 76, and the surrounding portions thereof deforming due to the bending rigidity of the fifth surface wall 72, the third coupling surface wall 76, and the surrounding portions thereof being increased. This enables the bending rigidity to be increased without adding separate components in addition to the upper panel 24 and the lower panel 26. The bending rigidities of the first vertical wall 36 and the second vertical wall 78 are also increased due to the first vertical wall 36 and the second vertical wall 78 overlapping with each other in plate thickness directions thereof and being joined together by the vertical wall joint 132. The bending rigidity of the first coupling surface wall 34 of the upper panel 24 and the third coupling surface wall 76 of the lower panel 26 is thereby further increased. This enables the bending rigidity of the upper panel 24 and the lower panel 26 to be further increased. This thereby enables the bending rigidity to be increased without adding separate components in addition to the upper panel 24 and the lower panel 26. This thereby enables the strength of the lower arm bracket 22 to be increased, while suppressing an increase in the number of components.

Second Exemplary Embodiment

Next, explanation follows regarding a suspension member lower arm bracket structure according to a second exemplary embodiment of the present disclosure, with reference to FIG. 6. Note that configuration parts similar to those of the first exemplary embodiment described above are allocated the same reference numerals, and explanation thereof is omitted.

As illustrated in FIG. 6, a suspension member lower arm bracket structure according to the second exemplary embodiment is configured similarly as that of the first exemplary embodiment, but includes a feature of a first vertical wall 108 of an upper panel 106 and the second vertical wall 78 of a lower panel 26 being joined together by vertical wall joints 113 provided at inner peripheral portions of a through-hole 111 formed in the first vertical wall 108.

Namely, in a lower arm bracket 110, the first vertical wall 108 is connected to an end portion 56 in the vehicle width direction of the first coupling surface wall 34 of the upper panel 106. The first vertical wall 108 extends from the end portion 56 toward the vehicle lower side, and is configured by a vertical wall main body 107 and a front side extension 109. The vertical wall main body 107 extends toward the vehicle lower side from the end portion 54 at the vehicle width direction outside of the first surface wall 28, and is formed substantially rectangular shaped in vehicle side view. The front side extension 109 is provided contiguously to the vertical wall main body 107, spanning from the end portion 56 in the length direction of the first coupling surface wall 34 to an end portion 58 in the vehicle width direction of the third surface wall 32.

The through-hole 111 is formed in the first vertical wall 108. The through-hole 111 is formed in a rectangular shape having its length direction in the vehicle vertical direction as viewed along a direction normal to the first vertical wall 108, and is formed penetrating the first vertical wall 108 in the plate thickness direction thereof.

The first vertical wall 108 of the upper panel 106 and the second vertical wall 78 of the lower panel 26 are disposed so as to overlap with each other when viewed along their plate thickness directions. Respective facing end portions 112 running along the length direction of the through-hole 111 in the first vertical wall 108, and a vehicle width direction outside face 114 of the second vertical wall 78, are joined together by the vertical wall joints 113. The vertical wall joints 113 are formed by welding along the end portions 112.

Operation of the Second Exemplary Embodiment

Next, explanation follows regarding operation of the present exemplary embodiment.

The above configuration exhibits operation similar to that of the first exemplary embodiment, due to the configuration being similar to that of the suspension member lower arm bracket structure according to the first exemplary embodiment, except for the first vertical wall 108 of the upper panel 106 and the second vertical wall 78 of the lower panel 26 being joined by the vertical wall joints 113 provided at the inner peripheral portion of the through-hole 111 formed in the first vertical wall 108. Namely, the upper panel 106 and the lower panel 26 are able to increase bending rigidity without adding separate components. This thereby enables the strength of the lower arm bracket 110 to be increased, while suppressing an increase in the number of components.

The first vertical wall 108 and the second vertical wall 78 are overlapped with each other and joined together. More specifically, the two end portions 112 running along the length direction of the through-hole 111 in the first vertical wall 108, and the vehicle width direction outside face 114 of the second vertical wall 78, are joined together by the vertical wall joints 113; namely, are joined together by the two vertical wall joints 113. Thus due to further increasing the join strength, the bending rigidity of the upper panel 106 and the lower panel 26 can thereby be further increased. This thereby enables the strength of the lower arm bracket 110 to be further increased, while suppressing an increase in the number of components.

In the present exemplary embodiment, configuration is made such that the two end portions 112 running along the length direction of the through-hole 111 in the first vertical wall 108, and the vehicle width direction outside face 114 of the second vertical wall 78, are joined together by the vertical wall joints 113. However, there is no limitation thereto, and as illustrated in FIG. 7, configuration may be made by joining using a vertical wall joint 115 welded around the entire periphery of the through-hole 111. In the case of this configuration, the vertical wall joint 115 is formed in a ring shape around the inner periphery of the through-hole 111. Namely, the join region is larger, and configuration is made such that there are no length direction end portions of the vertical wall joint 115 due to the vertical wall joint 115 being provided contiguously. Although stress is generally liable to concentrate at length direction end portions of the vertical wall joint 115, in the configuration of the present disclosure locations where stress is liable to concentrate are not provided, thereby enabling a joined state to be maintained. The join strength between the first vertical wall 108 and the second vertical wall 78 can thereby be further increased. This enables the strength of the lower arm bracket to be further increased, while suppressing an increase in the number of components.

Third Exemplary Embodiment

Figure 8:
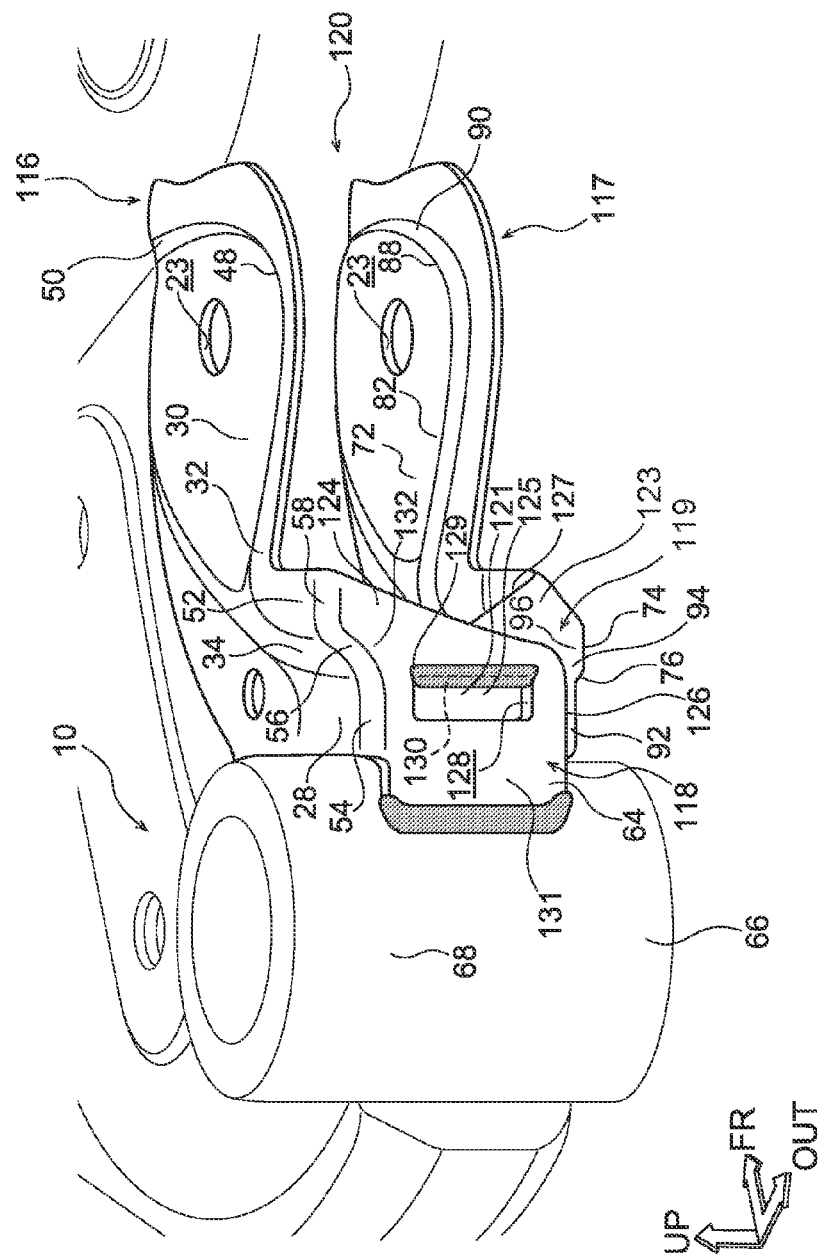
FIG. 8 is a perspective view illustrating a suspension member lower arm bracket structure according to a third exemplary embodiment.

Next, explanation follows regarding a suspension member lower arm bracket structure according to a third exemplary embodiment of the present disclosure, with reference to FIG. 8. Note that configuration parts similar to those of the first exemplary embodiment described above are allocated the same reference numerals, and explanation thereof is omitted.

As illustrated in FIG. 8, a suspension member lower arm bracket structure according to the third exemplary embodiment is configured similarly as that of the first exemplary embodiment, but includes a feature of a front side extension 122 of a first vertical wall 118 of an upper panel 116, and a front side extension 123 of a second vertical wall 119 of a lower panel 117, which extend in the vehicle vertical direction.

In a lower arm bracket 120, the first vertical wall 118 is connected to the end portion 56 in the length direction of the first coupling surface wall 34 of the upper panel 116, namely, in a direction along the circumferential direction of the bushing 42 (see FIG. 1). The first vertical wall 118 extends from the end portion 56 toward the vehicle lower side, and is configured by a vertical wall main body 131 and the front side extension 122. The vertical wall main body 131 extends toward the vehicle lower side from the end portion 54 at the vehicle width direction outside of the first surface wall 28, namely, from an end portion in a direction along the circumferential direction of the bushing 42 (see FIG. 1), and is formed substantially rectangular shaped in vehicle side view. The front side extension 122 is provided contiguously to the vertical wall main body 131, spanning from the end portion 56 in the length direction of the first coupling surface wall 34 (a direction along the circumferential direction of the bushing 42) to the end portion 58 at the vehicle width direction outside of the third surface wall 32 (a direction along the circumferential direction of the bushing 42). A front end portion 124 of the front side extension 122 extends obliquely, spanning from the end portion 58 of the third surface wall 32 to a lower end portion 126 of the vertical wall main body 131. Namely, the front side extension 122 extends in the vehicle vertical direction, spanning from the end portion 58 to the lower end portion 126.

A through-hole 128 is formed in the first vertical wall 118. The through-hole 128 is formed in a rectangular shape having its length direction in the vehicle vertical direction as viewed along a direction normal to the first vertical wall 118, and is formed penetrating the first vertical wall 118 in the plate thickness direction thereof.

In the lower arm bracket 120, the second vertical wall 119 is formed at the end portion 94 at the vehicle width direction outside of the third coupling surface wall 76 of the lower panel 117, namely, in a direction along the circumferential direction of the bushing 42 (see FIG. 1). The second vertical wall 119 extends from the end portion 94 toward the vehicle upper side, and is configured by a vertical wall main body 121 and the front side extension 123. The vertical wall main body 121 extends toward the vehicle upper side from the end portion 92 at the vehicle width direction outside of the fourth surface wall 70, namely, from an end portion in a direction along the circumferential direction of the bushing 42, and is formed substantially rectangular shaped in vehicle side view. The front side extension 123 is provided contiguously to the vertical wall main body 121, spanning from the end portion 94 in the length direction of the third coupling surface wall 76 (a direction along the circumferential direction of the bushing 42) to the end portion 96 at the vehicle width direction outside of the sixth surface wall 74 (in a direction along the circumferential direction of the bushing 42). A front end portion 127 of the front side extension 123 extends obliquely, spanning from the end portion 96 of the sixth surface wall 74 to an upper end portion, not illustrated in the drawings, of the vertical wall main body 121. Namely, the front side extension 123 extends in the vehicle vertical direction, spanning from the end portion 96 to the upper end portion.

The first vertical wall 118 of the upper panel 116 and the second vertical wall 119 of the lower panel 117 are disposed so as to overlap with each other as viewed along the plate thickness directions thereof. One end portion 130 running along the length direction of the through-hole 128 in the first vertical wall 118, and a vehicle width direction outside face 125 of the second vertical wall 119, are joined together by a vertical wall joint 129. The vertical wall joint 129 is formed by welding along the end portion 130.

Operation of the Third Exemplary Embodiment

Next, explanation follows regarding operation of the present exemplary embodiment.

The above configuration exhibits operation similar to that of the first exemplary embodiment, due to the configuration being similar to that of the suspension member lower arm bracket structure according to the first exemplary embodiment except for the front side extension 122 of the first vertical wall 118 of the upper panel 116 and the front side extension 123 of the second vertical wall 119 of the lower panel 117 extending in the vehicle vertical direction. Namely, the upper panel 116 and the lower panel 117 are able to increase bending rigidity, without adding separate components. This enables the strength of the lower arm bracket 120 to be increased, while suppressing an increase in the number of components.

Moreover, the bending rigidity of the upper panel 116 and the lower panel 117 can be further increased due to the first vertical wall 118 and the second vertical wall 119 being overlapped with each other and joined together. This enables the strength of the lower arm bracket 120 to be further increased, while suppressing an increase in the number of components.

Moreover, the front end portion 124 of the front side extension 122 of the first vertical wall 118 extends obliquely, spanning from the end portion 58 of the third surface wall 32 to the lower end portion 126 of the vertical wall main body 131. In other words, the surface area of the first vertical wall 118 as viewed along a direction normal thereto is set larger than that of the first vertical wall 36 of the first exemplary embodiment. Moreover, the front end portion 127 of the front side extension 123 of the second vertical wall 119 extends obliquely, spanning from the end portion 96 of the sixth surface wall 74 to an upper end portion, not illustrated in the drawings, of the vertical wall main body 121. In other words, the surface area of the second vertical wall 119 as viewed along a direction normal thereto is set larger than that of the second vertical wall 78 of the first exemplary embodiment. Accordingly, the bending rigidity of the first coupling surface wall 34 can be further increased by the first vertical wall 118 and the second vertical wall 119. This enables the strength of the lower arm bracket 120 to be further increased, while suppressing an increase in the number of components.

In the present exemplary embodiment, configuration is made such that the first vertical wall 118 is welded by the vertical wall joint 129 to the second vertical wall 119 at one location running along the vehicle vertical direction. However, there is no limitation thereto, and configuration may be made such that respective welds may be made along the end portion 130 of the through-hole 128 and another end portion opposite thereto. Moreover, configuration may be made such that the join is made using a vertical wall joint formed in a ring shape by welding around the entire periphery of the through-hole 128.

Moreover, in the present exemplary embodiment, configuration is made such that the surface area of the first vertical wall 118 of the upper panel 116 as viewed in a direction normal thereto, and the surface area of the second vertical wall 119 of the lower panel 117 as viewed in a direction normal thereto, are set larger than those in the first exemplary embodiment. However, there is no limitation thereto, and configuration may be made such that the surface area of one out of the first vertical wall 118 of the upper panel 116 or the second vertical wall 119 of the lower panel 117 as viewed in the normal direction thereof is set larger than that in the first exemplary embodiment.

Fourth Exemplary Embodiment

Figure 9:
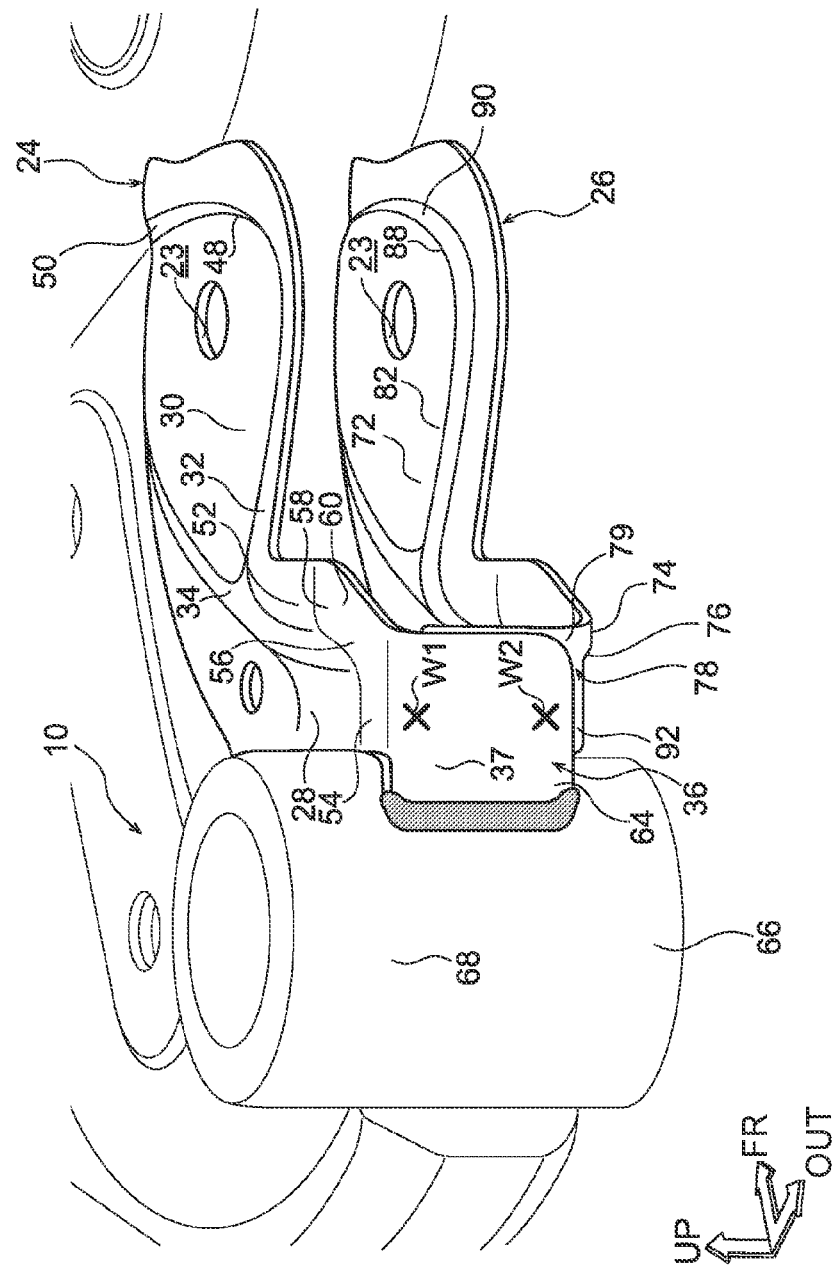
FIG. 9 is a perspective view illustrating a suspension member lower arm bracket structure according to a fourth exemplary embodiment.

Next, explanation follows regarding a suspension member lower arm bracket structure according to a fourth exemplary embodiment of the present disclosure, with reference to FIG. 9. Note that configuration components similar to those of the first exemplary embodiment described above are allocated the same reference numerals, and explanation thereof is omitted.

As illustrated in FIG. 9, the suspension member lower arm bracket structure according to the fourth exemplary embodiment is configured similarly as in the first exemplary embodiment, but includes a feature of a first vertical wall 36 of an upper panel 24 and a second vertical wall 78 of a lower panel 26 being joined together by dot shaped joints W1, W2, using spot welding.

Namely, the second vertical wall 78 is disposed at the inside in the plate thickness direction of the first vertical wall 36 so as to overlap. A vehicle upper side portion of the first vertical wall 36 and a vehicle upper side portion of the second vertical wall 78 are joined together by the dot shaped joint W1 using spot welding. Similarly, a vehicle lower side portion of the first vertical wall 36 and a vehicle lower side portion of the second vertical wall 78 are joined together by the dot shaped joint W2 using spot welding.

Operation of the Fourth Exemplary Embodiment

Next, explanation follows operation of the present exemplary embodiment.

The above configuration exhibits operation similar to that of the first exemplary embodiment, due to the configuration being similar to that of the suspension member lower arm bracket structure according to the first exemplary embodiment, except for the first vertical wall 36 of the upper panel 24 and the second vertical wall 78 of the lower panel 26 being joined by the dot shaped joints W1, W2 using spot welding. Namely, the upper panel 24 and the lower panel 26 are able to increase the bending rigidity, without adding separate components. This enables the strength of the lower arm bracket 22 to be increased, while suppressing an increase in the number of components.

Moreover, the first vertical wall 36 and the second vertical wall 78 overlap with each other and are joined together, enabling the bending rigidity of the upper panel 24 and the lower panel 26 to be further increased. This enables the strength of the lower arm bracket 22 to be further increased, while suppressing an increase in the number of components. Moreover, the operation time to join the first vertical wall 36 and the second vertical wall 78 together can be reduced due to joining the first vertical wall 36 and the second vertical wall 78 by the dot shaped joints W1, W2.

In the first to fourth exemplary embodiments described above, configuration is made such that the first vertical wall 36, 108, 118 is connected to the end portion 56 in the length direction of the first coupling surface wall 34, and the second vertical wall 78, 119 is connected to the end portion 94 in the length direction of the third coupling surface wall 76; however, there is no limitation thereto. Configuration may be made such that the first vertical wall 36, 108, 118 is disposed at a position corresponding to another end portion (omitted from illustration in the drawings) at the opposite side of the first coupling surface wall 34 to the end portion 56, and connected to this other end portion. Or configuration may be made such that the first vertical wall 36, 108, 118 is provided to both the end portion 56 and the other end portion. Moreover, configuration may be made such that the second vertical wall 78, 119 is disposed at a position corresponding to another end portion (omitted from illustration in the drawings) at the opposite side of the third coupling surface wall 76 to the end portion 94, and connected to this other end portion. Or configuration may be made such that the second vertical wall 78, 119 is provided to both the end portion 94 and to the other end portion.

Exemplary embodiments of the present disclosure have been explained above; however, the present disclosure is not limited to the above description, and obviously various other modifications may be implemented within a range not departing from the spirit of the present disclosure.

What is claimed is:

1. A suspension member lower arm bracket structure comprising:
　a suspension member provided at a vehicle lower side of a side member of a vehicle, the suspension member supported by the side member;
　a lower arm bracket provided at a vehicle width direction outer side of the suspension member;
　an upper panel that configures an upper portion of the lower arm bracket, and that is disposed at a position corresponding to an upper side face of the suspension member;
　a lower panel that configures a lower portion of the lower arm bracket, and that is disposed separated from the upper panel in a vehicle vertical direction at a position corresponding to a lower side face of the suspension member; and
　a bushing that is disposed between the upper panel and the lower panel such that an axial direction of the bushing is in the vehicle vertical direction;
　wherein the upper panel includes:
　　(i) a first surface wall that has a plate thickness direction in the vehicle vertical direction, and that includes an upper joint joined to the upper side face of the suspension member;
　　(ii) a second surface wall that is connected to the first surface wall through a first coupling surface wall, that is disposed offset from the first surface wall toward a vehicle upper side, and that includes a bushing upper end abutting portion that abuts an end portion at the vehicle upper side of the bushing;
　　(iii) a third surface wall that is connected to the second surface wall through a second coupling surface wall, that is disposed offset from the second surface wall toward the vehicle upper side, and that is formed along an end portion at the vehicle width direction outer side of the second surface wall; and
　　(iv) a first vertical wall that is connected to the first surface wall, the first coupling surface wall, and at least one end portion, in a circumferential direction of the bushing, of the second coupling surface wall and the third surface wall, and that extends toward a vehicle vertical direction lower side; and
　the lower panel includes:
　　(v) a fourth surface wall that has a plate thickness direction in the vehicle vertical direction, and that includes a lower joint joined to the lower side face of the suspension member;
　　(vi) a fifth surface wall that is connected to the fourth surface wall through a third coupling surface wall, that is disposed offset from the fourth surface wall toward a vehicle lower side, and that includes a bushing lower end abutting portion that abuts an end portion at the vehicle lower side of the bushing;
　　(vii) a sixth surface wall that is connected to the fifth surface wall through the fourth coupling surface wall, that is disposed offset from the fifth surface wall toward the vehicle lower side, and that is formed along an end portion at the vehicle width direction outer side of the fifth surface wall; and
　　(viii) a second vertical wall that is connected to the fourth surface wall, the third coupling surface wall, and at least one end portion, in the circumferential direction of the bushing, of the fourth coupling surface wall and the sixth surface wall, and that extends toward a vehicle vertical direction upper side, and wherein the first vertical wall and the second vertical wall are overlapped with each other as viewed along plate thickness directions thereof and joined together by a vertical wall joint.

2. The suspension member lower arm bracket structure of claim 1, wherein a through-hole is formed in one out of the first vertical wall or the second vertical wall so as to penetrate through in the plate thickness direction thereof, and the vertical wall joint is formed in a ring shape around an inner periphery of the through-hole.

* * * * *